(12) United States Patent
Blaschke et al.

(10) Patent No.: US 9,571,355 B2
(45) Date of Patent: Feb. 14, 2017

(54) NETWORK

(75) Inventors: Volker Blaschke, Ludwigsburg (DE);
Juergen Schirmer, Heidelberg (DE);
Tobias Lorenz, Schwieberdingen (DE);
Clemens Schroff, Kraichtal (DE); Timo Lothspeich, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 944 days.

(21) Appl. No.: 13/879,880

(22) PCT Filed: Sep. 28, 2011

(86) PCT No.: PCT/EP2011/066899
§ 371 (c)(1),
(2), (4) Date: Jun. 21, 2013

(87) PCT Pub. No.: WO2012/052270
PCT Pub. Date: Apr. 26, 2012

(65) Prior Publication Data
US 2013/0297783 A1 Nov. 7, 2013

(30) Foreign Application Priority Data

Oct. 19, 2010 (DE) .................. 10 2010 042 601

(51) Int. Cl.
*G06F 15/16* (2006.01)
*H04L 12/28* (2006.01)
(Continued)

(52) U.S. Cl.
CPC ......... *H04L 43/04* (2013.01); *H04L 12/40169* (2013.01); *H04L 2012/40273* (2013.01)

(58) Field of Classification Search
CPC .............. H04L 43/04; H04L 12/40169; H04L 2012/40273
(Continued)

(56) References Cited

U.S. PATENT DOCUMENTS 6,421,676 B1 * 7/2002 Krishnamurthy . G06F 17/30545
6,701,324 B1 * 3/2004 Nair .................. G06F 17/30545
707/752

(Continued)

FOREIGN PATENT DOCUMENTS

CN      101414975     4/2009
DE      197 14 761     10/1998
(Continued)

OTHER PUBLICATIONS

International Search Report for PCT/EP2011/066899, dated Apr. 17, 2012.
(Continued)

*Primary Examiner* — Madhu Woolcock
(74) *Attorney, Agent, or Firm* — Norton Rose Fulbright US LLP; Gerard Messina

(57) ABSTRACT

In a having a plurality of levels, each level has at least one information node; a number of information nodes of a lower k+1-th level are assigned to an information node of a k-th level configured thereabove and linked to this one information node; one information node of the lower k+1-th level is designed to inform the information node of the k-th level configured thereabove, which pieces of information the information node of the k+1-th level needs, and which pieces of information the information node of the k+1-th level is making available.

11 Claims, 3 Drawing Sheets

(51) Int. Cl.
 B60L 3/00 (2006.01)
 H04L 12/26 (2006.01)
 H04L 12/40 (2006.01)
(58) Field of Classification Search
 USPC .......................................... 709/201, 205, 223
 See application file for complete search history.

(56) References Cited

U.S. PATENT DOCUMENTS

| | | | |
|---|---|---|---|
| 6,975,633 B1* | 12/2005 | T'Joens | H04Q 11/0478 370/401 |
| 7,484,008 B1 | 1/2009 | Gelvin et al. | |
| 2002/0143755 A1 | 10/2002 | Wynblatt et al. | |
| 2003/0115303 A1 | 6/2003 | Marian et al. | |
| 2003/0172111 A1* | 9/2003 | Gubbi | H04L 12/4641 709/203 |
| 2004/0196809 A1* | 10/2004 | Dillinger | H04W 36/02 370/331 |
| 2006/0111825 A1 | 5/2006 | Okada et al. | |
| 2007/0011382 A1* | 1/2007 | Roever | G06F 13/1663 710/240 |
| 2009/0147714 A1 | 6/2009 | Jain et al. | |
| 2010/0042727 A1 | 2/2010 | White | |

FOREIGN PATENT DOCUMENTS

| | | |
|---|---|---|
| DE | 102005 055 173 | 5/2006 |
| EP | 0 828 213 | 3/1998 |
| JP | 2006-142994 | 6/2006 |
| TW | I250742 | 3/2006 |
| WO | WO 01/26331 | 4/2001 |
| WO | WO 2009/075619 | 6/2009 |

OTHER PUBLICATIONS

Banerjee et al.: "Scalable Peer Finding on the Internet", Globecom, 2002, IEEE Global Telecommunications Conference, Nov. 17-21, 2002, vol. 3, pp. 2205-2209.

* cited by examiner

NETWORK

BACKGROUND OF THE INVENTION

1. Field of the Invention

The present invention relates to a network and to a method for exchanging information.

2. Description of the Related Art

Communication systems in motor vehicles typically include a plurality of different bus systems, such as CAN, LIN or FlexRay, for example. The communication systems are used for exchanging a multiplicity of brief pieces of information, which, depending on the resolution, are mostly smaller than 8 bytes, cyclically or in an event-controlled manner among connected control units. These pieces of information are combined by a particular control unit into brief messages. By combining individual pieces of information into messages, the bandwidth required for the transmission is reduced, since an improved ratio of metadata, respectively control data to the actual useful data is provided. The metadata are provided by a header and/or a trailer of the message. Typically, the header (head) includes information pertaining to a source address and/or target address, as well as a type of a data packet to be transmitted. Generally, a trailer (appendage) includes a checksum, as well as control and management information.

In comparison to automotive communications protocols, there is a substantial need for control data when working with the Internet Protocol (IP) in the realm of computer networks. In this case, a customary use is the transmission of large-volume data packets, which, in comparison to individual pieces of information within data packets that are transmitted in the motor vehicle, have a large proportion of useful data. These are typically files or streaming data that are transmitted using long data packets. In comparison to the useful data, the meta data here have a smaller volume, so that a favorable ratio between the meta and useful data is obtained.

When the Internet Protocol, respectively IP technology is used in the motor vehicle, an exchange of the brief pieces of information described above leads to an unfavorable utilization of the communication capacity. In comparison to an Internet transmission, the proportion of metadata within a data packet is large in the case of an IP transmission due to the system-related protocol overhead of metadata, so that an unfavorable ratio between the meta data and useful data results.

BRIEF SUMMARY OF THE INVENTION

By combining individual pieces of information and, thus, useful data into larger messages that are transmitted as data packets, the present invention makes it possible to enhance the efficiency of packet-based communication. An optimal ratio between meta and useful data may be thereby achieved. The concept of the information node is introduced for this purpose. The described method is generally suited for IP communication, respectively for any packet-based communication where an entire network, respectively global network is partitioned into subnets that form the domains of the network, so that it has a hierarchical design having a treelike branched structure, for example.

In addition, all of the pieces of information are only sent to those information nodes that require them. No pieces of information are sent to information nodes that do not require specific pieces of information. In addition, this economizes on bandwidth for the pieces of information to be transmitted.

An information node is at least a typically central point within a level of the network, through or over which a multitude of pieces of information propagate and are thus exchanged. In this context, a network may contain a plurality of information nodes. An information node is equipped with one or a plurality of network interfaces, a memory, a processing unit and, as the case may be, a time base.

In the embodiment of the present invention, a technical device is provided that may be in the form of a motor vehicle, for example, having at least one technical unit. Accordingly, this technical device may also include a plurality of spatially distributed and interconnected units, where required. The at least one unit may have at least one component embodied as an information node, the at least one unit likewise being able to be embodied as an information node. All of the information nodes of the technical device make up the normally hierarchically structured network. Within the network, an information node is assigned to at least one level within the network. Accordingly, a level includes all information nodes that are assigned thereto. An information node may be assigned to a level in accordance with hierarchical, functional and/or local aspects, the levels generally being configured one over the other. Within the network, a level is defined as a grouping of information nodes that may have functional commonalities. In this case, an uppermost, first level normally has only one information node. In one embodiment of the present invention, the number of information nodes per level is all the greater, the lower they are configured within a hierarchy of the network. In addition, it is possible, for example, for information nodes of one unit to form a level of the network within a network for a technical device that is spatially distributed over a plurality of units.

The network interfaces are used for exchanging information, i.e., for transmitting and/or receiving the same. The memory is designed for storing at least one piece of information, generally at least the most current information in each instance. The processing unit is designed for decomposing received messages into individual pieces of information and for storing the same in the memory. In addition, the processing unit is designed for combining at least one piece of information, generally a plurality of pieces of information, from the memory in a new message and thus in a new data packet. The combined pieces of information make up the useful data of the message. The possibly existing time base makes it possible to ensure a necessary periodicity of periodic pieces of information. Since every information node, i.e., also every device embodied as an information node knows which pieces of information are provided within a message for this information node, the information node may filter out these pieces of information, which are directed to this information node, from the message.

From the viewpoint of computer networking, as an information node, a router is suited, for example, i.e., a module for coupling networks, respectively a switch, i.e., a module, typically a distributor, for linking networks and/or domains of networks. One information node is generally designed for connecting and/or coupling at least two subnets of the network. These information nodes or similar components may be configured in motor vehicles once the existing networking architecture in the motor vehicle transitions to an IP-based networking. Thus, a hierarchical structure of the communication network is provided in the motor vehicle, where the entire network is partitioned in appropriate form into subnets.

The network according to the present invention is designed for implementing all steps of the presented method. In this context, individual steps of this method may also be carried out by individual components of the network. In addition, functions of the network or functions of individual components of the network may be implemented as steps of the method. Moreover, it is possible for steps of the method to be realized as functions of at least one component of the network or of the entire network.

It is understood that the aforementioned features and those which are still to be explained in the following may be used not only in the particular stated combination, but also in other combinations or alone, without departing from the scope of the present invention.

DETAILED DESCRIPTION OF THE INVENTION

Figure 1:
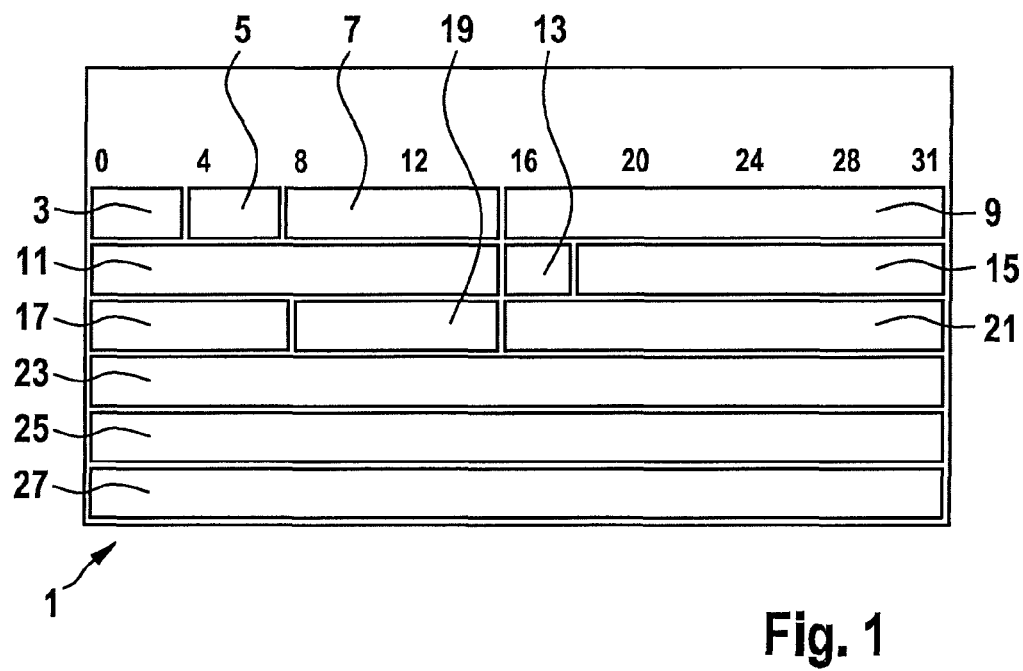
FIG. 1 shows, in a schematic representation, an example of a header data field, as is used in the case of an Internet Protocol of version 4 (IPv4) for transmitting messages.

The present invention is schematically illustrated in the drawings on the basis of specific embodiments and is described in detail in the following with reference to the drawings.

The figures are described collectively and comprehensively, the same reference numerals denoting functionally equivalent components.

Figure 2:
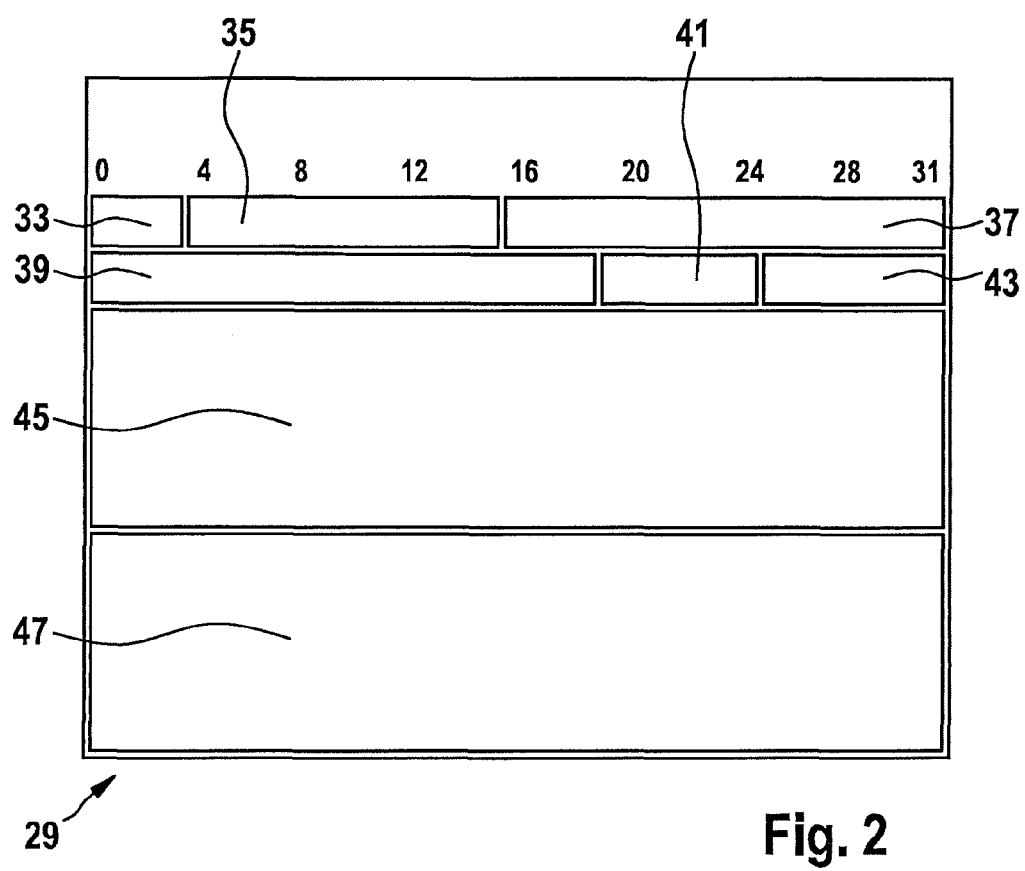
FIG. 2 shows, in a schematic representation, an example of a header data field, as is used in the case of an Internet Protocol of version 6 (IPv6) for transmitting messages.

At the present time, two different versions of the Internet Protocol exist, i.e., a version 4 (IPv4) and a version 6 (IPv6), which are differentiated, inter alia, by the field number and length of a header, respectively header data field of a data packet and thus of a message to be sent. FIG. 1 shows the structure of a header data field 1 and thus of a header 4, as is used for an Internet Protocol of version 4 (IPv4) to introduce a data packet (frame) as a message to be sent. FIG. 2 schematically shows the structure of a header data field 29 in accordance with version 6 of the Internet Protocol.

This header data field 1 having a width of 32 bits contains information about a version 3 of header data field 1 having a width of 4 bits, information on a length 5 of the data packet having a width of 4 bits, this length 5 also being abbreviated as IHL for the IP header length, information on a service type 7 (TOS, Type of Service) having a width of 8 bits, as well as information on a total length 9 of the data packet having a width of 16 bits.

In addition, header data field 1 includes an identification 11 having a width of 16 bits, a control switch 13 (flag) having a width of 3 bits, and information about a fragmentation 15 (fragment offset) having a width of 13 bits. Moreover, information about a lifetime 17 (Time to Live, TTL) of the data packet having a width of 8 bits, information about Internet Protocol 19 used within the scope of the embodiment of the present invention having a width of 8 bits, and a checksum 21 having a width of 16 bits are provided. Header data field 1 described here in accordance with Internet Protocol 19 of version 4 also includes information about a source address 23, a target address 25 and, in some instances, at least information about further options 27, which each have a width of 32 bits.

A header data field 29 for a data packet (frame), and thus a message of an Internet Protocol of version 6 (IPv6) is shown schematically in FIG. 2. This header data field 29, respectively header configured as an IPv6 header data field contains information about a version 33 having a width of 4 bits, information about a priority allocation 35 (traffic class) having a width of 8 bits, information about a flow value 57 (flow label) having a width of 20 bits, information about a length 39 of a content of the data packet configured as an IPv6 data packet having a width of 16 bits, information for identifying 41 a subsequent header data field having a width of 8 bits, and information on a maximum number of intermediate steps 43 (hop limit) that the assigned data packet is allowed to execute via a router, given a width of 8 bits. Moreover, illustrated IPv6 header data field 29 includes a source address 45 and a destination address 47, which each have a width of 128 bits.

Due to the minimal permissible length of an Ethernet frame, the minimal length of an IP data packet that is transmitted over the Ethernet, is 64 bytes. Therefore, the efficiency of the transmission in IP-based networks results from the ratio between the useful data, which contain the information which is actually to be transmitted, and the metadata, respectively control data, which, inter alia, also include header data field 1, 29, respectively the header.

Figure 3:
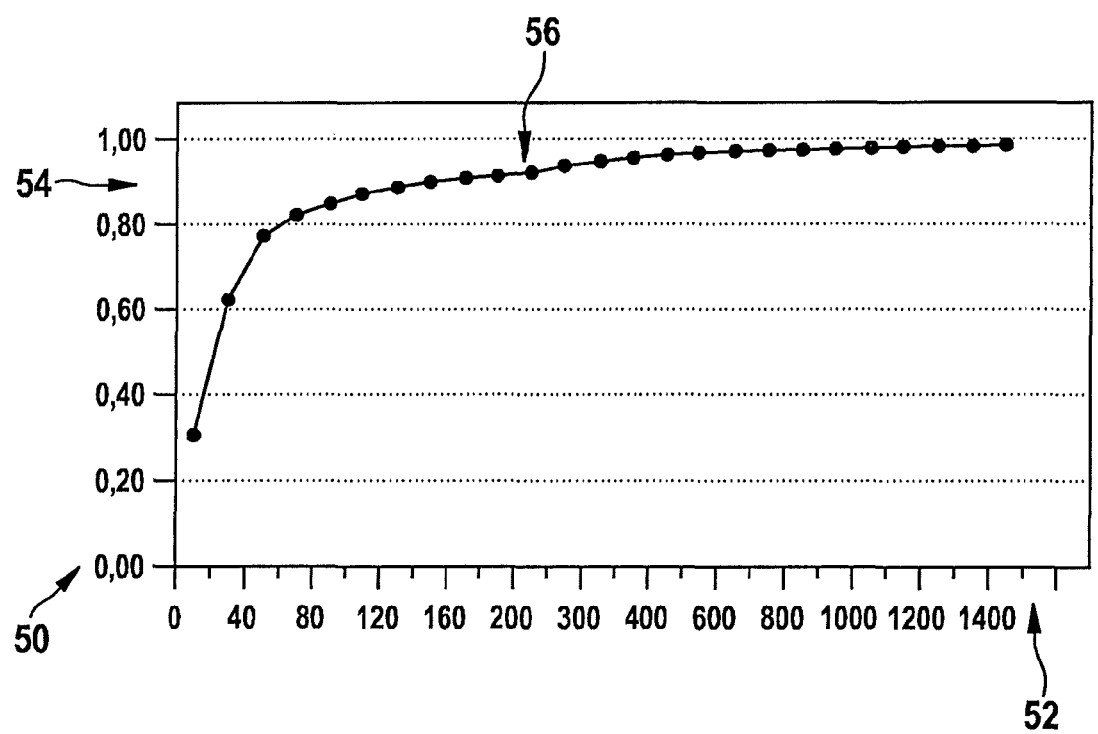
FIG. 3 shows a diagram for illustrating a ratio of a length of useful data to the entire length of the entire data packet that is sent via an Ethernet frame.
Figure 4:
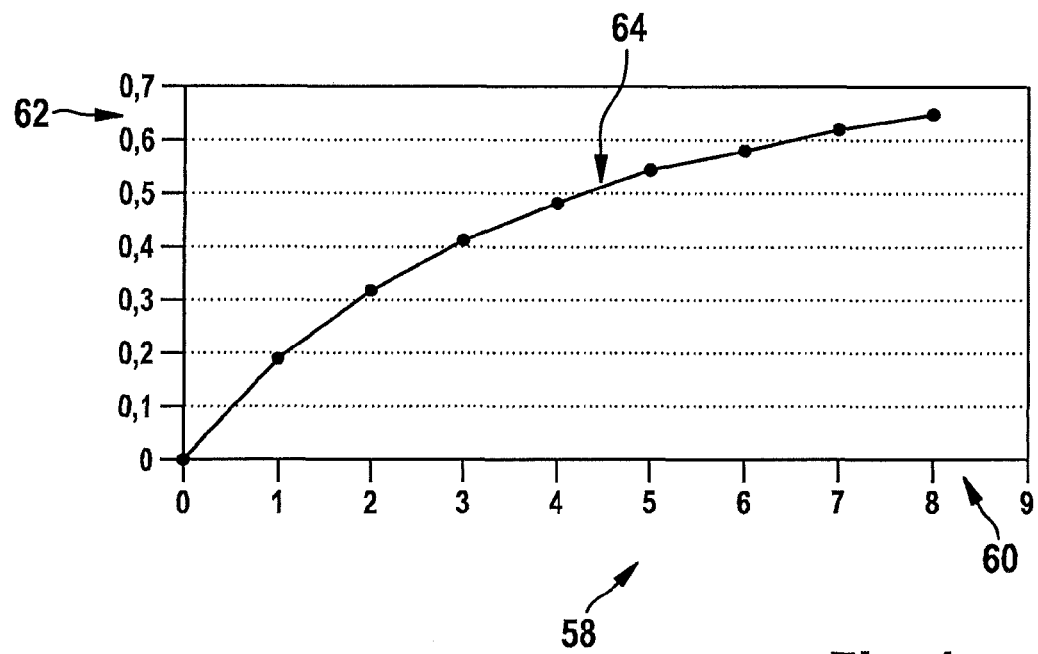
FIG. 4 shows a diagram for illustrating a ratio of a length of useful data to the entire length of the data packet that is sent via a CAN frame.

Examples of ratios of the metadata to the useful data within a data packet that is used to send a message, are illustrated in the diagrams of FIGS. 3 and 4.

Diagram 50 of FIG. 3 includes an abscissa 52 along which, in the byte unit, a quantity of useful data within a data packet in an Ethernet frame is indicated. A ratio of the length of the useful data (payload) of the data packet to a total length of the data packet is plotted along an ordinate 54. In this context, the entire length of the data packet includes the length of the useful data, as well as the length of the metadata which, inter alia, also includes the length of the header data field, respectively of the header of the data packet.

A proportion of the useful data and thus of information bytes over the entire length of the data packet is illustrated by curve 56 in diagram 50 of FIG. 3.

In the case of a useful datum, respectively a payload of 8 bytes in an Ethernet and/or IP frame, the efficiency of a capacity utilization of the data packet is below 44%.

FIG. 4 shows a diagram 58 having an abscissa 60, along which, in the byte unit, a length of useful data of a data packet and, thus, of a message that is sent via a CAN standard frame is plotted.

A ratio of a length of the useful data of the data packet to a total length of the data packet is plotted along an ordinate 62 of diagram 58, that includes the length of the useful data, as well as the length of the metadata. Within diagram 58, this ratio of useful data and thus of information bytes to the entire length of the data packet, respectively a proportion is indicated by curve 64.

In the case of standard CAN frame, the bits of the identifier up until acknowledge are considered. In this context, in the case of 8 bytes of useful data, an effective capacity utilization of the data packet of 65% is achieved, as is shown in diagram 58 in FIG. 4.

Figure 5:
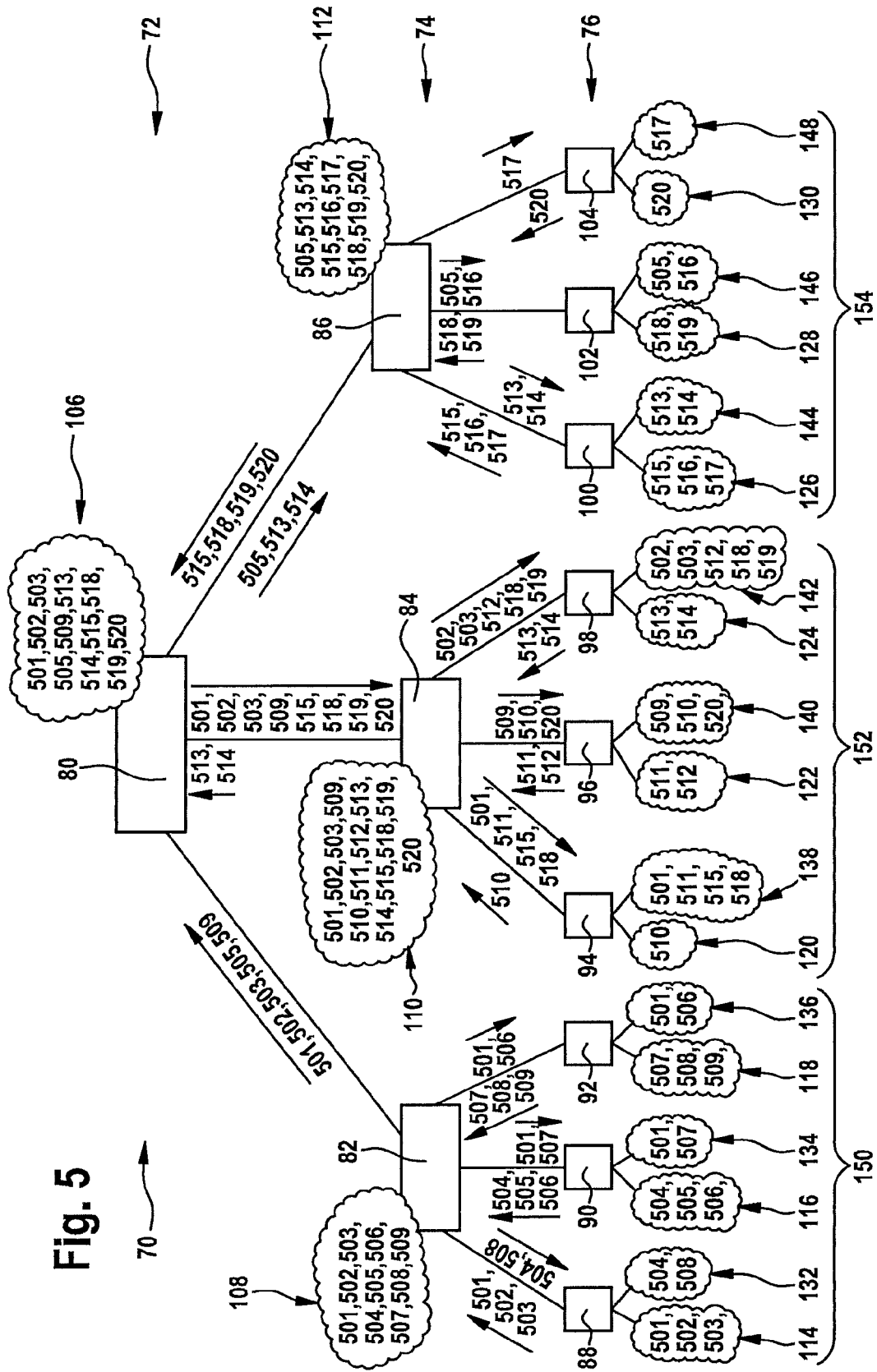
FIG. 5 shows, in a schematic representation, a specific embodiment of a network according to the present invention.

In a schematic representation, FIG. 5 shows a specific embodiment of network 70 according to the present invention for an IP-based networking, as could be configured in a motor vehicle. This network 70 shown here has a hierarchically organized, tree-type structure and includes three levels 72, 74, 76. In this context, an information node in the form of a main node 80 is configured in an uppermost, first level 72. A middle, second level 74 is configured below first level 72 and above a lower, here lowermost, third level 76. This second level 74 includes a first information node, which is configured at the same time as a first domain node 82, as well as a second information node, which is embodied at the same time as a second domain node 84, as well as a third information node, which is embodied at the same time as a third domain node 86. The mentioned information nodes of second level 74 embodied as domain nodes 82, 84, 86 are subordinate or assigned to the one information node of first level 72 embodied as main node 80. Third level 76 configured below second level 74 includes, as an information node, a first device 88, a second device 90, a third device 92, a fourth device 94, a fifth device 96, a sixth device 98, a seventh device 100, an eighth device 102, as well as a ninth device 104. In the described specific embodiment, three information nodes of third level 76 embodied as devices 88, 90, 92, 94, 96, 98, 100, 102, 104 are subordinate or assigned in each case to one information node of second level 74 embodied in each case as domain node 82, 84, 86.

In addition, a cloud 106 is assigned to main node 80, a cloud 108 to first domain node 82, a cloud 110 to second domain node 84, and a cloud 112 to third domain node 86. Assigned to each device 88, 90, 92, 94, 96, 98, 100, 102, 104 are in each case a first cloud 114, 116, 118, 120, 122, 124, 126, 128, 130 (left) and a second cloud 132, 134, 136, 138, 140, 142, 144, 146, 148 (right).

Moreover, network 70 is divided into three subnets 150, 152, 154. In this context, in a first subnet 150, first device 88, second device 90 and third device 92 are assigned to first domain node 82. In a second subnet 152, fourth device 94, fifth device 96, and sixth device 98 are assigned to second domain node 84. Within a third subnet 154, seventh device 100, eighth device 102, and ninth device 104 are assigned to third domain node 86.

Pieces of information 501, 502, 503, 504, 505, 506, 507, 508, 509, 510, 511, 512, 513, 514, 515, 516, 517, 518, 519, 520, which are stored by the particular information node and are intended to be exchanged, are entered into clouds 106, 108, 110, 112, 114, 116, 118, 120, 122, 124, 126, 128, 130, 132, 134, 136, 138, 140, 142, 144, 146, 148.

In the case of devices 88, 90, 92, 94, 96, 98, 100, 102, 104, it is discerned whether pieces of information 501, 502, 503, 504, 505, 506, 507, 508, 509, 510, 511, 512, 513, 514, 515, 516, 517, 518, 519, 520 are needed by a device 88, 90, 92, 94, 96, 98, 100, 102, 104. These are each entered into a second cloud 132, 134, 136, 138, 140, 142, 144, 146, 148 (right) or, in the case that the pieces of information 501, 502, 503, 504, 505, 506, 507, 508, 509, 510, 511, 512, 513, 514, 515, 516, 517, 518, 519, 520 are made available by device 88, 90, 92, 94, 96, 98, 100, 102, 104, these pieces of information provided 501, 502, 503, 504, 505, 506, 507, 508, 509, 510, 511, 512, 513, 514, 515, 516, 517, 518, 519, 520 are entered in each case in a first cloud 114, 116, 118, 120, 122, 124, 126, 128, 130 (left).

The numbers and arrows on the lines among the information nodes symbolize the direction in which the particular piece of information 501, 502, 503, 504, 505, 506, 507, 508, 509, 510, 511, 512, 513, 514, 515, 516, 517, 518, 519, 520 flows. The lines schematically illustrate communication channels to which the information nodes are linked.

The manner in which individual subnets 150, 152, 154 of network 70, which are coupled and/or linked by domain nodes 82, 84, 86, are partitioned is freely selectable and is to be undertaken in the motor vehicle, for example, as a function of an EE architecture. Conceivable, for example, is a local partitioning of devices 88, 90, 92, 94, 96, 98, 100, 102, 104 to be networked in the motor vehicle (rear, front, left, right, top, bottom, etc.) or a partitioning in accordance with functional domains, for example, passenger compartment (body), chassis, powertrain, infotainment, etc.

The architecture and the number of main nodes 80, domain nodes 82, 84, 86 per main node 80 and devices 88, 90, 92, 94, 96, 98, 100, 102, 104 per domain node 82, 84, 86 are shown entirely arbitrarily in FIG. 5 and, in reality, are to be freely selected in consideration of the particular hardware, respectively the desired architecture. Likewise conceivable is a greater number of levels 72, 74, 76 for a finer subdivision of entire network 70 into subnets 150, 152, 154. Main nodes 80 and/or domain nodes 82, 84, 86 may likewise take over the functionalities of devices 88, 90, 92, 94, 96, 98, 100, 102, 104 to provide an improved hardware partitioning. An enhanced fault tolerance (redundancy) may be achieved by using intermeshed structures.

The illustrated specific embodiment of network 70 provides for lowermost third layer, which includes devices 88, 90, 92, 94, 96, 98, 100, 102, 104, which informs next higher second level 74 which pieces of information 501, 502, 503, 504, 505, 506, 507, 508, 509, 510, 511, 512, 513, 514, 515, 516, 517, 518, 519, 520 are needed by devices 88, 90, 92, 94, 96, 98, 100, 102, 104, and which pieces of information 501, 502, 503, 504, 505, 506, 507, 508, 509, 510, 511, 512, 513, 514, 515, 516, 517, 518, 519, 520 are made available by devices 88, 90, 92, 94, 96, 98, 100, 102, 104.

In this regard, two possible examples, which may be implemented in the illustrated specific embodiment of the method, are described.

In accordance with a first example, first device 88 informs first domain node 82 that it is generating pieces of information 501, 502, and 503 and is thus making them available, and that it needs pieces of information 504 and 508. Thus, first device 88 has subscribed to pieces of information 504 and 508 in the case of first domain node 82. Since it is configured in lowermost layer 74, first domain node 82 has implicitly subscribed to pieces of information 501, 502 and 503 from first device 88, since the assumption is that these pieces of information 501, 502 and 503 are needed by another device 90, 92, 94, 96, 98, 100, 102, 104 in network 70. The same holds equivalently for second device 90 and third device 92, as well as for pieces of information 501, 504, 505, 506, 507, 508 and 509 needed by, respectively made available by these devices 90, 92.

At this point, first domain node 82 knows that all pieces of information 501, 504, 506, 507 and 508 needed in first subnet 150 are also generated in first subnet 150. Thus, first domain node 82 does not need to subscribe to any pieces of information 501, 502, 503, 504, 505, 506, 507, 508 and 509 in the case of higher-level main node 80 of first level 72. First domain node 82 informs main node 80 that pieces of information 501, 502, 503, 504, 505, 506, 507, 508 and 509 are available from it.

In a second example, eighth device 102 informs third domain node 86 that eighth device 102 is generating pieces of information 518 and 519 and needs pieces of information 505 and 516. Thus, eighth device 102 has subscribed to pieces of information 505 and 516 in the case of third domain node 86. Since eighth device 102 is configured in the lowermost, third level 76, third domain node 82 has implicitly subscribed to pieces of information 518 and 519 of eighth device 102, since the assumption is that these pieces of information 518 and 519 are needed by another device 88, 90, 92, 94, 96, 98, 100, 104 in network 70. The same holds equivalently for seventh device 100 and ninth device 104, as well as for pieces of information 513, 514, 515, 516, 517 and 520 needed by, respectively made available by these devices 100, 104.

At this point, third domain node 86 knows that pieces of information 505, 513, 514 are not generated in third subnet 154 and subscribes to these at main node 80. At the same time, main node 80 reports that that pieces of information 515, 516, 517, 518, 519 and 520 are generated in third subnet 154, and that these are available from it.

The same holds correspondingly for first and second subnet 150, 152 and for pieces of information 501, 502, 503, 504, 505, 506, 507, 508, 509, 510, 511, 512, 513, 514, 515, 518, 519 and 520 needed by, respectively made available by them. Main node 80 knows, in turn, from where it may obtain which pieces of information 501, 502, 503, 504, 505, 506, 507, 508, 509, 510, 511, 512, 513, 514, 515, 516, 517, 518, 519, 520, and which domain node 82, 84, 86 requires which pieces of information 501, 502, 503, 504, 505, 506, 507, 508, 509, 510, 511, 512, 513, 514, 515, 516, 517, 518, 519, 520. At this point, it subscribes to pieces of information 501, 502, 503, 505, 509, 513, 514, 515, 518, 519 and 520 that are needed in the different subnets 150, 152, 154, but are not generated in subnet 150, 152, 154 specific thereto. From first domain node 82, it subscribes to pieces of information 501, 502, 503, 505 and 509; from second domain node 84, it subscribes to pieces of information 513 and 514; and from third domain node 86, it subscribes to pieces of information 515, 518, 519 and 520.

It is now possible for every information node to appropriately combine pieces of information 501, 502, 503, 504, 505, 506, 507, 508, 509, 510, 511, 512, 513, 514, 515, 516, 517, 518, 519, 520 into messages, without violating the requirements for timing, periodicity, maximum delay, etc., when these requirements are known, respectively exchanged.

Information 501, 502, 503, 504, 505, 506, 507, 508, 509, 510, 511, 512, 513, 514, 515, 516, 517, 518, 519, 520 may be subscribed to in network 70, for example, in that multicast addresses are generated correspondingly.

The principle presented within the scope of the specific embodiment illustrated here of network 70 according to the present invention may be statically implemented or also automated. To that end, additional data on the particular piece of information 501, 502, 503, 504, 505, 506, 507, 508, 509, 510, 511, 512, 513, 514, 515, 516, 517, 518, 519, 520 are needed, for example, pertaining to the length, whether it is a periodic, respectively event-based piece of information 501, 502, 503, 504, 505, 506, 507, 508, 509, 510, 511, 512, 513, 514, 515, 516, 517, 518, 519, 520 or, as the case may be, pertaining to the periodicity of the information 501, 502, 503, 504, 505, 506, 507, 508, 509, 510, 511, 512, 513, 514, 515, 516, 517, 518, 519, 520. These data are stored in each device 88, 90, 92, 94, 96, 98, 100, 102, 104 and may be passed through, as needed from lowermost third level 76 to upper, higher levels 72, 74. For this, it is provided that resources in the form of memories be available in the information nodes.

In the case of an intermeshed network 70, what is generally referred to as "load balancing" is possible as an additional measure. It is thereby achieved that all paths between two points and, thus, information nodes are thereby utilized to the same degree.

It is likewise conceivable that information nodes in the form of domain nodes, main nodes and/or devices 80, 82, 84, 86, 88, 90, 92, 94, 96, 98, 100, 102, 104 also feature at least one interface to other communication systems or communication configurations. Thus, for example, CAN-capable sensors may be read out directly by an information node. For that, a type of gateway and, thus, a protocol converter may be additionally implemented in the information node.

Generally, at least one of devices 88, 90, 92, 94, 96, 98, 100, 102, 104 shown and, thus, an information node of lowermost level 76 is embodied as a control unit (ECU) of at least one technical device, for example, a motor vehicle. Usually, a mechanical method may be carried out using at least one technical device of this kind. A device 88, 90, 92, 94, 96, 98, 100, 102, 104 in the form of a control unit is provided for controlling and/or regulating at least one component of the at least one technical device. In addition, devices 88, 90, 92, 94, 96, 98, 100, 102, 104 may be configured as sensors for recording states of operating parameters of at least one technical device, or as actuators for acting upon components of the at least one technical device. It is also possible that at least one device 88, 90, 92, 94, 96, 98, 100, 102, 104 described here not be configured as a control unit, but as a communication device, respectively antenna, radio or navigation system, which may be set up for exchanging information with the outside world and/or for making information available to the driver that, as the case may be, is based on the exchanged data.

A plurality of devices 88, 90, 92, 94, 96, 98, 100, 102, 104 embodied, for example, as control units from lowermost, third level 76 of the at least one technical device are each subordinate to a domain node 82, 84, 86, which is a superordinate component, respectively a superordinate control unit that handles at least one technical device from second level 74. Domain nodes 82, 84, 86, and thus components of second level 74, are subordinate to main node 80 of first level 72. This main node 80 is normally conceived as a central component, for example, as a central control unit, which at least makes up a technical device.

In a further embodiment, the described present invention may also be used for networks that may be configured in other technical devices and/or systems having a plurality of technical devices, respectively in devices and/or systems used in security technology, automation technology, household automation technology, etc.

In one specific embodiment of the present invention, a hierarchical network 70 having n=3 levels 72, 74, 76 is provided for a motor vehicle. This network 70 encompasses a multitude of devices 88, 90, 92, 94, 96, 98, 100, 102, 104, typically sensors, actuators and/or control units of the motor vehicle, which represent the information nodes of, in this case, third, lowermost level 76 and thus define lowermost level 76. These devices 88, 90, 92, 94, 96, 98, 100, 102, 104 are subdivided into groups and, in this context, usually assigned to subnets 150, 152, 154, which, for example, is carried out in accordance with functional or local criteria within the motor vehicle. Each device 88, 90, 92, 94, 96, 98, 100, 102, 104 of a group is linked to a shared information node, the particular domain node 82, 84, 86 that is superordinate, respectively assigned to this group. The set of domain nodes 82, 84, 86 of all groups makes up the information nodes of the superordinate, here middle, second level 74 and thus defines middle level 74. All of domain nodes 82, 84, 86 are linked to a common, superordinate information node, main node 80. This domain node 80 forms the information node of uppermost, first level 74 and thus defines uppermost level 72.

What is claimed is:

1. A communication network for exchanging information, comprising:
   a plurality of levels comprising a plurality of information nodes on at least a k-th level configured above a lower k+1-th level, wherein the k-th level comprises two or more domain nodes of the plurality of information nodes and wherein the lower k+1-th level comprises a plurality of device nodes of the plurality of information nodes;
   wherein at least a group of the plurality of device nodes are assigned and linked to a first domain node of the two or more domain nodes;
   wherein each device node of the group of the plurality of device nodes is assigned to a first subnet of a plurality of subnets,
   wherein each device node of the group of the plurality of device nodes informs the first domain nodes of pieces of information generated in the first subnet by the group of the plurality of device nodes and of needed pieces of information needed by each device node of the group of the plurality of device nodes wherein the needed pieces of information are generated by device nodes belonging to another of the plurality of subnets and assigned to one of the two or more domain nodes other than the first domain node;
   wherein the first domain node informs a main node at a level above the k-th level of the pieces of information generated in the first subnet;
   wherein the first domain node subscribes to the needed pieces of information by reporting to the main node; and
   wherein the plurality of information nodes combine into message the pieces of information generated in the first subnet with the subscribed to needed pieces of information to achieve a ratio between metadata and payload data in communications between the plurality of information nodes.

2. The communication network as recited in claim 1, where at least one of the plurality of information nodes is configured for interconnecting the plurality of subnets of the communication network.

3. The communication network as recited in claim 1, wherein multiple devices are configured in a lowermost level of the communication network, and wherein one device is linked to an information node of a level configured above the lowermost level.

4. The communication network as recited in claim 3, wherein each of the plurality of device nodes of the communication network has an information node.

5. The network as recited in claim 3, wherein each of the plurality of information nodes includes at least a network interface, a memory, a processing unit.

6. The communication network as recited in claim 5, wherein each of the plurality of information nodes includes a time base.

7. The network as recited in claim 3, wherein:
   the communication network is a hierarchical network in a motor vehicle;
   the communication network includes n levels;
   the multiple devices are at least one of sensors, actuators, and control units of the motor vehicle;
   the multiple devices are subdivided into groups and assigned to the plurality of subnets;
   all device of a particular group are linked to a shared domain node of the plurality of domain nodes which is (i) superordinate to the particular group and (ii) configured as an information node;
   the plurality of of domain nodes of all groups form a middle level; and
   the plurality of domain nodes are linked to the main node which is configured as an information node and forms an uppermost level of the network.

8. A method for exchanging information in a communication network having a plurality of levels comprising a plurality of information nodes on at least a k-th level configured above a lower k+1-th level, wherein the k-th level comprises two or more domain nodes of the plurality of information nodes and wherein the lower k+1-the level comprises a plurality of device nodes of the plurality of information nodes wherein at least a group of the plurality of device nodes are assigned and linked to a first domain node of the two or more domain nodes, the method comprising:
   assigning each device node of the group of the plurality of device nodes to a first subnet of a plurality of subnets;
   causing each device node of the group of the plurality of device nodes to inform the first domain nodes of pieces of information generated in the first subnet by the group of the plurality of device nodes and of needed pieces of information needed by each device node of the group of the plurality of device nodes, wherein the needed pieces of information are generated by device nodes belonging to another of the plurality of subnets and assigned to one of the two or more domain nodes other than the first domain node;
   controlling the first domain node to inform a main node at a level above the k-th level of the pieces of information generated in the first subnet;
   controlling the first domain node to subscribe to the needed pieces of information by reporting to the main node; and
   controlling the plurality of information nodes to combine into message the pieces of information generated in the first subnet with the subscribed to needed pieces of information to achieve a ratio between metadata and payload data in communications between the plurality of information nodes.

9. The method as recited in claim 8, wherein multiple pieces of information to be sent between two levels of the network are combined as useful data in one message.

10. The method as recited in claim 9, where at least one piece of information is only sent to a single information node.

11. The method as recited in claim 9, wherein the multiple pieces of information are sent via an Internet Protocol.

\* \* \* \* \*